May 6, 1958 I. HOROWITZ 2,833,957

RADIATION RECEIVER SENSITIVITY CONTROL

Filed Dec. 17, 1956

*INVENTOR.*
IRVING HOROWITZ

*BY* Rines and Rines

ATTORNEYS 2,833,957

RADIATION RECEIVER SENSITIVITY CONTROL

Irving Horowitz, Eatontown, N. J., assignor, by mesne assignments, of one-half to Isaac S. Blonder and one-half to Ben H. Tongue Application December 17, 1956, Serial No. 628,696
11 Claims. (Cl. 315—10)

Figures 1, 2:
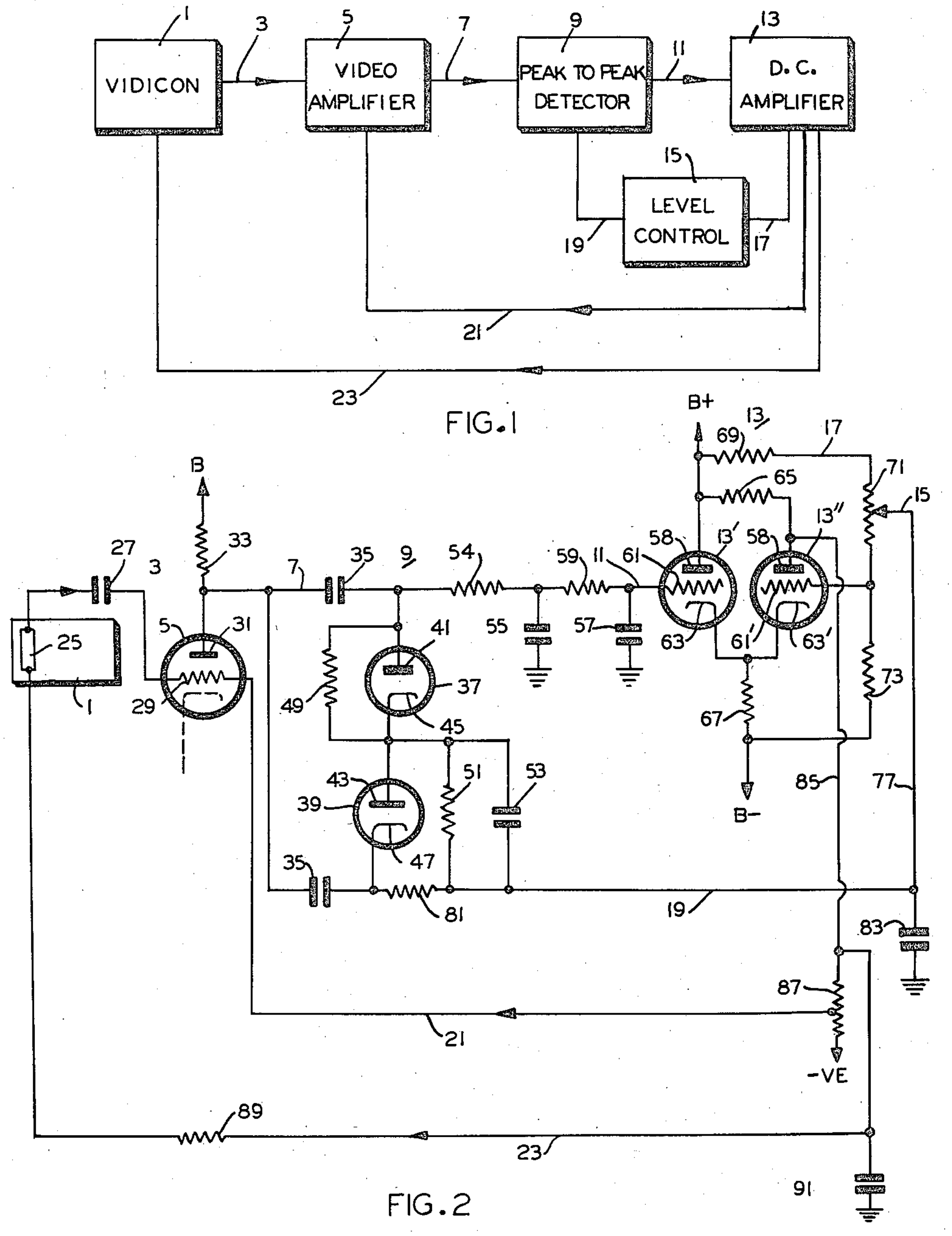

The present invention relates to radiation receiver sensitivity control systems and, more particularly, to systems for varying the sensitivity of a radiation receiver in accordance with the radiation intensity impinged thereupon.

Several expedients have been proposed for automatically controlling the sensitivity of a radiation receiver or detector as the level of incident radiation intensity varies, thereby to produce relatively uniform signals in the receiver or detector even though the radiation intensity may fluctuate within wide limits. In the field of television, for example, various types of circuits have been proposed for controlling the sensitivity of the light pick-up tube or vidicon so that high-intensity light images will not overload or saturate the receiver while low-intensity images can, nonetheless, be detected. Included in such proposals, are video-signal-level control circuits and photocell-monitor control systems. Unfortunately, however, such proposals are subject to one or more limitations, including variation of performance with change in operating voltages or circuit components, variation in reference-voltage level, complexity and relatively high cost.

An object of the present invention, accordingly, is to provide a new and improved radiation-sensitivity control system that shall not be subject to any of the above-mentioned disadvantages and that, to the contrary, shall operate with uniform performance irrespective of voltage or other variations in the system. In summary, this end is attained with the aid of a first feed-back path connected between control-signal-producing means and radiation-receiver signal-amplifying means to which the control-signal-producing means is connected, providing a first closed-circuit control loop comprising the signal-amplifying means and the control-signal-producing means. A second feed-back path is also employed, connected between the control-signal-producing means and the radiation-sensitive receiver to provide a second closed-circuit control loop comprising the radiation-sensitive receiver, the signal-amplifying means and the control-signal-producing means. The sensitivity of both the radiation-sensitive receiver and the signal-amplifying means is thereby varied simultaneously in accordance with the radiation intensity impinged upon the receiver.

While, moreover, the invention will hereinafter be described, for illustrative purposes, in connection with its application to the important vidicon system, it is to be understood that the invention is also of broader applicability being useful with other types of radiation receivers or detectors, as well.

Other and further objects will be explained hereinafter and will be more particularly pointed out in the appended claims.

The invention will now be described in connection with the accompanying drawing Fig. 1 of which is a block diagram illustrating the principles underlying the invention; and Fig. 2 is a schematic circuit diagram illustrating the invention in preferred form.

A vidicon light radiation receiver or detector 1 produces signals corresponding to the radiation impinged thereupon and, by way of conductor 3, feeds the signals to a video amplifier stage or stages 5. The output of the video amplifier 5 is fed by conductor 7 to a detector 9, preferably, though not imperatively, of the hereinafter-described peak-to-peak type. The detected signal is applied by conductor 11 to one or more direct-current amplifier stages 13. The level of operation of the direct-current amplifier 13 is preferably controlled through a level control 15 interconnected by conductors 17 and 19 between the amplifier 13 and the peak-to-peak detector 9.

In accordance with the present invention, a first feed-back path 21 is provided connected from the output of the direct-current amplifier 13 to the input of the video amplifier 5. A first closed-loop control circuit is thus provided comprising the video amplifier 5, the peak-to-peak detector 9, the direct-current amplifier 13 and the feed-back path 21. The output of the direct-current amplifier 13 is also fed back by conductor 23 to the vidicon 1 in order to provide a second closed-circuit control loop comprising the vidicon 1, the video-signal amplifier 5, the peak-to-peak detector 9, the direct-current amplifier 13 and the feed-back path 23. As later explained, the use of these two closed-loop control circuits enables the simultaneous automatic variation in the sensitivity of both the vidicon 1 and the video amplifier 5 in accordance with variation in the incident radiation. Since both control loops are closed, moreover, the same reference level always exists in the system at all times, insuring uniform operation irrespective of voltage or other variations.

The manner in which the system of Fig. 1 is preferably operated is illustrated in Fig. 2. The vidicon 1 is provided with a light-radiation sensitive signal plate or target 25 upon which is focused the radiation from the scene-to-be-televised. The other well-known details of the vidicon 1, including the electron stream that scans the target 25 to generate the video signals representative of the light radiation image impinged upon the signal plate or target 25 are not shown in order not to confuse the disclosure. Similarly, all of the details of the video amplifier electron tube 5 are not illustrated since they are quite conventional and would only serve to complicate the circuit diagram and detract from the actual features of novelty. It is to be understood, of course, that more than one video amplifier tube 5 may, if desired, be used, and, indeed, other types of amplifier and related circuits may be employed, including transistors. The signal target 25 is shown connected through a coupling condenser 27 by means of the conductor 3 to the control-grid electrode 29 of the amplifier 5. The plate or anode 31 of the amplifier 5 is connected to the B+ terminal of the anode or plate-voltage supply through a plate load resistor 33.

The amplified video signal is applied from the plate or anode 31 by conductor 7 to the detector 9. In the preferred form, this detector 9 comprises a pair of series-connected diodes 37 and 39. The anode 41 of the diode 37 is fed from conductor 7 through a coupling capacitor 35. The cathode 45 of the diode 37 is connected to the anode 43 of the other diode 39, with a resistor 49 shunting the diode 37, between its anode 41 and cathode 45. Similarly, resistors 51 and 81 shunt the diode 39, between its anode 43 and cathode 47, the resistor 51 being by-passed by a capacitor 53. The application of the positive portions of the signal voltages to the anode 41 will, of course, cause conduction through the diode, providing a direct-current detected voltage that is applied by conductor 11 to the control-grid electrode 61 of the first tube 13' of the direct-current amplifier 13. By connecting the video-amplifier output conductor 7 through a further coupling capacitor 35' to the cathode 47 of the second diode 39, the second diode is oppositely energized, detecting the negative portions of the amplified signals. Both the positive and negative signal portions and peaks are thus detected, producing control voltages that are applied to the direct-current amplifier 13 for amplification.

Interposed between the tube 13' of the direct-current amplifier 13 and the peak-to-peak detector 9 is an alternating-current low-pass filter illustrated as of the $\pi$-type comprising a series resistive arm 59, connected between the resistor 54 and the control-grid electrode 61 of the tube 13' and shunt-connected capacitors 55 and 57. Only voltages representative of the magnitude of the amplified video signals therefore reach the direct-current amplifier 13. The anode or plate 58 of the direct-current amplifier tube 13' is connected to the B+ supply terminal and the cathode 63 is connected through a resistor 67 to the B— terminal. The second tube 13'' associated with the direct-current amplifier tube 13' is cathode-coupled to the tube 13' by connecting the cathode 63' thereof to the cathode 63 of the stage 13'. The plate or anode 58' of the tube 13'' is also coupled to the plate or anode 58 of the tube 13' through a resistor 65. The output of the direct-current amplifier 13 is fed by conductor 85 through an intermediately tapped resistor 87 to the feed-back conductor 21 which, in turn, connects with the control-grid electrode 29 of the video amplifier 5. The gain or sensitivity of the video amplifier 5 is thus controlled in accordance with the direct-current control voltage fed back from the direct-current amplifier 13 to the video amplifier 5. The direct-current output is also fed back by conductor 23, connected to the upper terminal of the beforementioned resistor 87, through a resistor 89 to the signal target or plate 25 of the vidicon 1. Since the sensitivity of the vidicon 1 is controlled by the potential applied to the target 25, the sensitivity being decreased as the target potential becomes less positive, the direct-current control voltage from the amplifier 13 also simultaneously controls the sensitivity of the vidicon 1. The feed-back path 23 is shown decoupled to ground by a capacitor 91. The lower terminal of the resistor 87 is returned to a negative potential terminal —ve that supplies the normal operating bias potential for the video amplifier 5.

In the particular cathode-coupled direct-current amplifier 13 illustrated in Fig. 2, amplification is effected without phase reversal, so that there is available in the output conductor 85 the same phase control voltage that has been detected by the peak-to-peak detector 9 and fed through the filter network 55, 59, 57. While there is no signal present on the control-grid electrode 61' of the tube 13'', bias voltage is applied thereto by resistors 69 and 71, connected by conductor 17 between the B+ voltage supply terminal and the control-grid electrode 61'. The grid 61' is returned to the B— terminal by a resistor 73. The level of operation of the amplifier 13 is controlled by tapping off any desired portion of the resistor 71 at 15, and feeding the resulting voltage by conductors 77 and 19 to the cathode 47 of the diode 39 of the peak-to-peak detector 9. The control 15 is shown decoupled to ground by the capacitor 83. The level control 15 determines how far the cathode 63' of the amplifier 13'' approaches cut off. As the peak-to-peak detector 9 reaches the mid-point of its operation, both the vidicon 1 and the video amplifier 5 will have their sensitivity simultaneously reduced in proportion to the video signal. Automatic control of the sensitivity is thus provided. The control operation is maintained uniform irrespective of the variations in voltages and circuits, as a result of the utilization of the two closed feed-back loops before referred to. The loops, moreover, will always operate with the same reference in view of their closed nature.

It is, of course, to be understood that other types of detectors and amplifiers, as before mentioned, may similarly be employed in accordance with the teachings of the present invention.

Further modifications will occur to those skilled in the art and all such are considered to fall within the spirit and scope of the invention as defined in the appended claims.

What is claimed is:

1. An electric system having, in combination, a radiation-sensitive receiver, signal-amplifying means connected to the receiver for producing an amplified signal corresponding to the radiation impinged upon the receiver, means responsive to the signal-amplifying means and adapted to recover direct-current components of the amplified signal for producing therefrom a control signal representative of the magnitude of the amplified signal, a first feed-back path connected between the control-signal-producing means and the signal-amplifying means providing a first closed-circuit control loop comprising the signal-amplifying means and the control-signal-producing means, and a second feed-back path connected between the control-signal-producing means and the radiation-sensitive receiver providing a second closed-circuit control loop comprising the radiation-sensitive receiver, the signal-amplifying means and the control-signal-producing means, whereby the sensitivity of both the radiation-sensitive receiver and the signal-amplifying means is varied simultaneously in accordance with the radiation intensity impinged upon the receiver.

2. An electric system having, in combination, a radiation-sensitive receiver, signal-amplifying means connected to the receiver for producing an amplified signal corresponding to the radiation impinged upon the receiver, detector means for detecting components of the amplified signal, direct-current amplifier means responsive to the detector means, a first feed-back path connected between the direct-current amplifier means and the signal-amplifying means providing a first closed-circuit control loop comprising the signal-amplifying means, the detector means and the direct-current amplifier means, and a second feed-back path connected between the direct-current amplifier means and the radiation-sensitive receiver providing a second closed-circuit control loop comprising the radiation-sensitive receiver, the signal-amplifying means, the detector means and the direct-current amplifier means, whereby the sensitivity of both the radiation-sensitive receiver and the signal-amplifying means is varied simultaneously in accordance with the radiation intensity impinged upon the receiver.

3. An electric system having, in combination, a radiation-sensitive receiver video signal-amplifying means connected to the receiver for producing an amplified video signal corresponding to the radiation impinged upon the receiver, peak-to-peak detector means for detecting components of the amplified video signal, direct-current amplifier means responsive to the detector means, a first feed-back path connected between the direct-current amplifier means and the video signal-amplifying means providing a first closed-circuit control loop comprising the video signal-amplifying means, the detector means and the direct-current amplifier means, and a second feed-back path connected between the direct-current amplifier means and the radiation-sensitive receiver providing a second closed-circuit control loop comprising the radiation-sensitive receiver, the video signal-amplifying means, the detector means and the direct-current amplifier means, whereby the sensitivity of both the radiation-sensitive receiver and the video signal-amplifying means is varied simultaneously in accordance with the radiation intensity impinged upon the receiver.

4. An electric system having, in combination, a radiation-sensitive vidicon, signal-amplifying means connected to the vidicon for producing an amplified signal corresponding to the radiation impinged upon the vidicon, detector means responsive to the signal-amplifying means for producing therefrom a control signal representative of the magnitude of the amplified signal, a first feed-back path connected between the detector control-signal-producing means and the signal-amplifying means providing a first closed-circuit control loop comprising the signal-amplifying means and the detector control-signal-producing means, and a second feed-back path connected between the control-signal-producing means and the radiation-sensitive vidicon providing a second closed-circuit control loop comprising the radiation-sensitive vidicon, the signal-amplifying means and the detector control-signal-producing means, whereby the sensitivity of both the radiation-sensitive vidicon and the signal-amplifying means is varied simultaneously in accordance with the radiation intensity impinged upon the vidicon.

5. An electric system having, in combination, a radiation-sensitive vidicon, signal-amplifying means connected to the vidicon for producing an amplified signal corresponding to the radiation impinged upon the vidicon, detector means for detecting components of the amplified signal, direct-current amplifier means responsive to the detector means, a first feed-back path connected between the direct-current amplifier means and the signal-amplifying means providing a first closed-circuit control loop comprising the signal-amplifying means, the detector means and the direct-current amplifier means, and a second feed-back path connected between the direct-current amplifier means and the radiation-sensitive vidicon providing a second closed-circuit control loop comprising the radiation-sensitive vidicon, the signal-amplifying means, the detector means and the direct-current amplifier means, whereby the sensitivity of both the radiation-sensitive vidicon and the signal-amplifying means is varied simultaneously in accordance with the radiation intensity impinged upon the vidicon.

6. An electric system having, in combination, a radiation-sensitive vidicon, video signal-amplifying means connected to the vidicon for producing an amplified video signal corresponding to the radiation impinged upon the vidicon, peak-to-peak detector means for detecting components of the amplified video signal, direct-current amplifier means responsive to the detector means, a first feed-back path connected between the direct-current amplifier means and the video signal-amplifying means providing a first closed-circuit control loop comprising the video signal-amplifying means, the detector means and the direct-current amplifier means, and a second feed-back path connected between the direct-current amplifier means and the radiation-sensitive vidicon providing a second closed-circuit control loop comprising the radiation-sensitive vidicon, the video signal-amplifying means, the detector means and the direct-current amplifier means, whereby the sensitivity of both the radiation-sensitive vidicon and the video signal-amplifying means is varied simultaneously in accordance with the radiation intensity impinged upon the vidicon.

7. An electric system having, in combination, a vidicon provided with a radiation-sensitive signal target, video signal-amplifying means provided with control electrode means connected to the vidicon signal target, detector means for detecting components of the amplified video signal, direct-current amplifier means responsive to the detector means, a first feed-back path connected between the direct-current amplifier means and the said control electrode means providing a first closed-circuit control loop comprising the video signal-amplifying means, the detector means and the direct-current amplifier means, and a second feed-back path connected between the direct-current amplifier means and the vidicon signal target providing a second closed-circuit control loop comprising the vidicon, the video signal-amplifying means, the detector means and the direct-current amplifier means, whereby the sensitivity of both the vidicon and the video signal-amplifying means is varied simultaneously in accordance with the radiation intensity impinged upon the vidicon target.

8. An electric system having, in combination, a vidicon provided with a radiation-sensitive signal target, video signal-amplifying means provided with control electrode means connected to the vidicon signal target, detector means comprising positive and negative peak detectors for detecting components of the amplified video signal, direct-current amplifier means responsive to the detector means, a first feed-back path connected between the direct-current amplifier means and the said control electrode means providing a first closed-circuit control loop comprising the video signal-amplifying means, the detector means and the direct-current amplifier means, and a second feed-back path connected between the direct-current amplifier means and the vidicon signal target providing a second closed-circuit control loop comprising the vidicon, the video signal-amplifying means, the detector means and the direct-current amplifier means, whereby the sensitivity of both the vidicon and the video signal-amplifying means is varied simultaneously in accordance with the radiation intensity impinged upon the vidicon target.

9. An electric system having, in combination, a vidicon provided with a radiation-sensitive signal target, video signal-amplifying means provided with control electrode means connected to the vidicon signal target, detector means comprising a pair of diodes oppositely fed to operate as positive and negative peak detectors for detecting components of the amplified video signal, direct-current amplifier means responsive to the detector means, low-pass filter means connecting the detector means to the direct-current amplifier means, a first feed-back path connected between the direct-current amplifier means and the said control electrode means providing a first closed-circuit control loop comprising the video signal-amplifying means, the detector means and the direct-current amplifier means, and a second feed-back path connected between the direct-current amplifier means and the vidicon signal target providing a second closed-circuit control loop comprising the vidicon, the video signal-amplifying means, the detector means and the direct-current amplifier means, whereby the sensitivity of both the vidicon and the video signal-amplifying means is varied simultaneously in accordance with the radiation intensity impinged upon the vidicon target.

10. An electric system as claimed in claim 9 and in which there are provided voltage-supply means for operating the direct-current amplifier means and means for variably tapping voltage from the said voltage-supply means to control the level of operation of the direct-current amplifier means.

11. An electric system having, in combination, a radiation-sensitive receiver, signal-amplifying means connected to the receiver for producing an amplified signal corresponding to the radiation impinged upon the receiver, means including direct-current amplifier means responsive to the signal-amplifying means for producing therefrom a control signal representative of the magnitude of the amplified signal, a first feedback path connected between the control-signal-producing means and the signal-amplifying means providing a first closed-circuit control loop comprising the signal-amplifying means and the control-signal-producing means, and a second feedback path connected between the control-signal-producing means and the radiation-sensitive receiver providing a second closed-circuit control loop comprising the radiation-sensitive receiver, the signal-amplifying means and the control-signal-producing means, whereby the sensitivity of both the radiation-sensitive receiver and the signal-amplifying means is varied simultaneously in accordance with the radiation intensity impinged upon the receiver.

References Cited in the file of this patent

UNITED STATES PATENTS 2,786,960 Palmer ---------------- Mar. 26, 1957